United States Patent
Schmidtke et al.

(10) Patent No.: US 7,024,758 B2
(45) Date of Patent: Apr. 11, 2006

(54) ASSEMBLY FOR ALIGNING A COMPONENT

(75) Inventors: Gregg S. Schmidtke, Ft. Collins, CO (US); Kelly J. Reasoner, Ft. Collins, CO (US); Duane L. Harmon, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 216 days.

(21) Appl. No.: 10/447,343

(22) Filed: May 28, 2003

(65) Prior Publication Data
US 2004/0237278 A1 Dec. 2, 2004

(51) Int. Cl.
*B23P 19/00* (2006.01)
*B25B 27/14* (2006.01)
*A47B 81/06* (2006.01)

(52) U.S. Cl. ............... 29/729; 29/281.1; 312/9.43

(58) Field of Classification Search ............ 29/464, 29/729, 737, 741, 281.1, 281.6, 271, 466, 29/830, 744, 739; 312/9.43, 298, 334.27; 360/98.04, 98.01
See application file for complete search history.

(56) References Cited

U.S. PATENT DOCUMENTS 6,648,428 B1 * 11/2003 Chaloner et al. .......... 312/9.43

* cited by examiner

*Primary Examiner*—John C. Hong

(57) ABSTRACT

An assembly for aligning a component, comprising an alignment guide positioned on a first device and at least one attachment point on the first device. The component is included in a second device, and the component is aligned by the alignment guide as the second device is attached to the first device. A flexible portion of material can be attached to the component and positioned over the mounting structures. The alignment guides retain the flexible portion of material with respect to the mounting structures as the second device is attached to the first device, thereby aligning the component in three dimensions.

19 Claims, 9 Drawing Sheets

ASSEMBLY FOR ALIGNING A COMPONENT

BACKGROUND

As components in electronic devices are increasingly miniaturized, it becomes more difficult to accurately align the components to a known reference location. Some components, such as infrared (IR) transceivers, are used to provide communication for robotic devices. It is therefore necessary to position the IR transceiver in a precise location to enable the robotic device to accurately perform its tasks. For example, many types of cartridge storage and handling systems store data storage cartridges in slots at known locations and retrieve desired cartridges to read data from, or write data to, the cartridges. Such data storage and handling systems are often referred to as "autochangers" or "juke box" data storage systems, particularly if they accommodate a large number of individual cartridges.

An autochanger storage system typically includes cartridge storage racks or magazines to provide storage locations for the cartridges. The magazines are commonly arranged so that they form one or more stacks of storage slots. A cartridge read/write device may be located adjacent the cartridge stack, although the read/write device can be positioned at any convenient location. The storage system includes a robotic cartridge access device for accessing the various cartridges, and a positioning device for moving the access device between the storage slots and the read/write device.

When a host computer system issues a request for data contained on a particular cartridge, a control system associated with the access device actuates the positioning system to move the access device adjacent the desired cartridge. The access device then removes the cartridge from the magazine and carries it to the read/write device. The access device inserts the selected cartridge into the read/write device so that the host computer may thereafter read data from, or write data to, the cartridge. After the read/write operation is complete, the access device removes the cartridge from the read/write device and returns it to a specified location in the cartridge storage rack.

In order to retrieve the correct cartridges, insert the cartridges in the read/write devices, and return the cartridges to the correct storage slot, it is necessary to provide the control system with information regarding the position of the access device. In some systems, information regarding the position of the access device is communicated via an IR communication system. The magazines include a visual cue that is recognized by an image processing module on the access device. During calibration, the access device compares the sensed location of the cue to a stored reference location of the cue, and updates the reference location, as required.

An IR communication system typically includes an IR transceiver and a reflecting mirror. The transceiver includes an IR light emitting diode to output light signals, and a detector photodiode to detect incoming light signals. The input/output light signals are reflected at a 90 degree angle by a mirror positioned near the transceiver. It is therefore important to accurately orient the IR transceiver to achieve the 90 degree angle for optimum signal transmission and reception. It is also important to know the location of the IR transceiver to calibrate the location of the access device. It is also desirable to develop an apparatus that can be used to accurately position and align various other types of components in addition to IR transceivers.

SUMMARY

In accordance with some embodiments, an assembly for aligning a component comprises a first device, an alignment guide positioned on the first device, and at least one attachment point on the first device. The component is included in a second device, and is aligned by the alignment guide as the second device is attached to the first device.

In accordance with other embodiments a storage system comprises a cartridge access device, a plurality of alignment guides attached to the cartridge access device, and a housing for an optical communications device. The housing is attached to the cartridge access device over the alignment guides so that the alignment guides position the optical communications device in proper position for operation.

In accordance with further embodiments a method for aligning a component in a device comprises attaching the component to a portion of material, overlaying the material over a mounting structure with the component positioned within the mounting structure, and engaging a set of alignment guides to retain the material in the mounting structure.

BRIEF DESCRIPTION OF THE DRAWINGS

Embodiments of the invention relating to both structure and method of operation, may best be understood by referring to the following description and accompanying drawings.

DETAILED DESCRIPTION

A particular embodiment of an assembly for accurately aligning a component is shown in FIGS. 1 through 4B. While use of the assembly to align an infrared (IR) transceiver 202 (FIG. 2) on a cartridge access device 100 (FIG. 1) for a storage library 700 (FIG. 7) is shown in FIGS. 1 through 4B and discussed herein as an example, it is important to note that such an assembly can be used to accurately align components of virtually any size and shape, in one, two, and three dimensions, in various types of systems.

Figure 1:
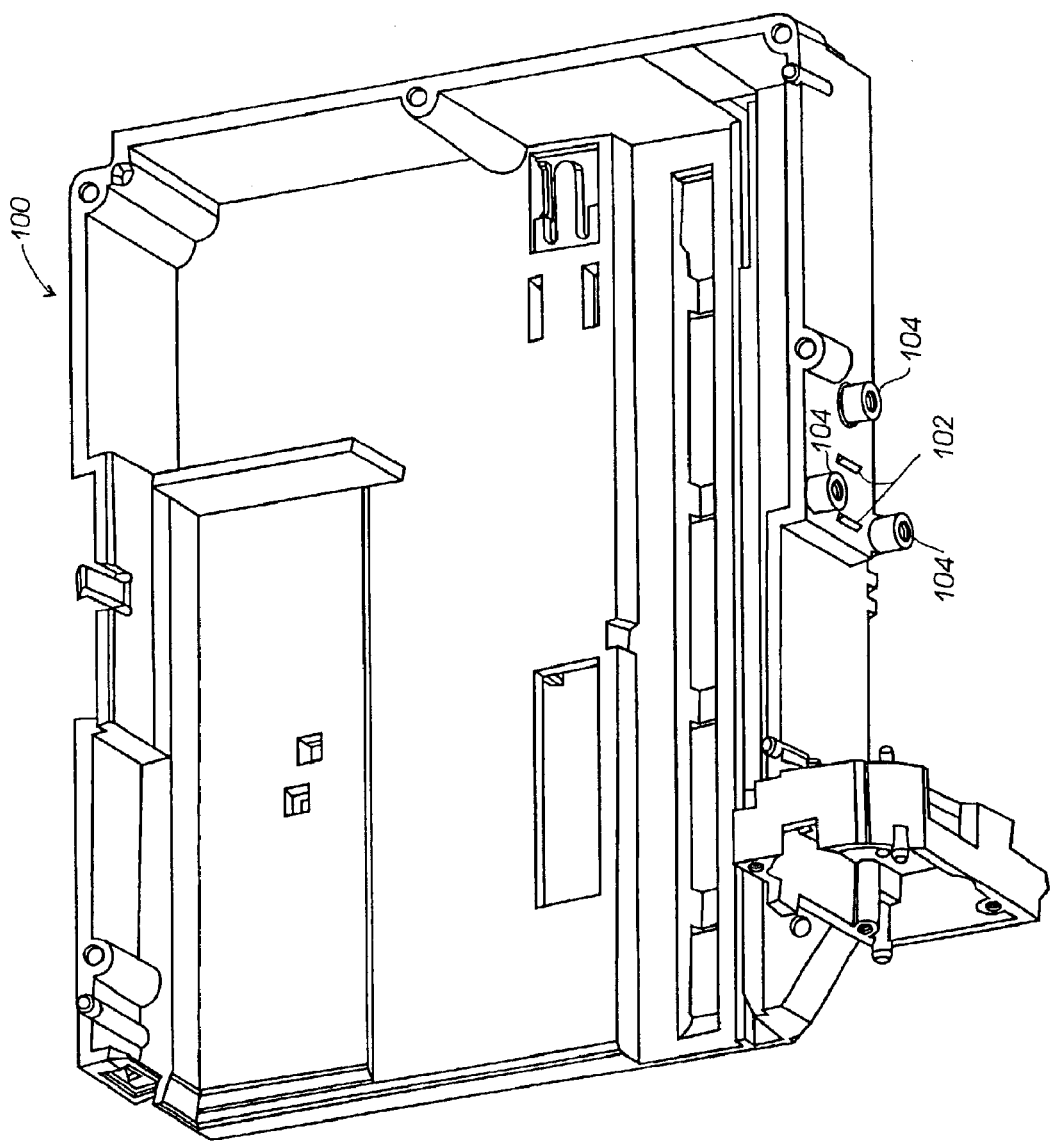
FIG. 1 is a perspective view of the inside and lower edge of an embodiment of a cartridge access device with alignment guides.
Figure 3:
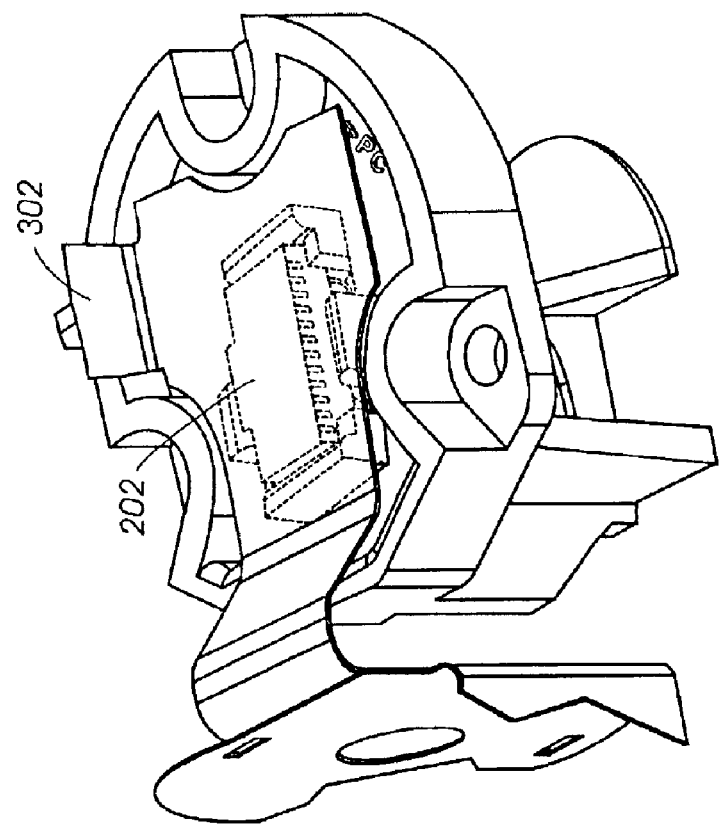
FIG. 3 is a three dimensional perspective view of the housing of FIG. 2 with a flex circuit overlaying a portion of the housing and the transceiver.
Figure 2:
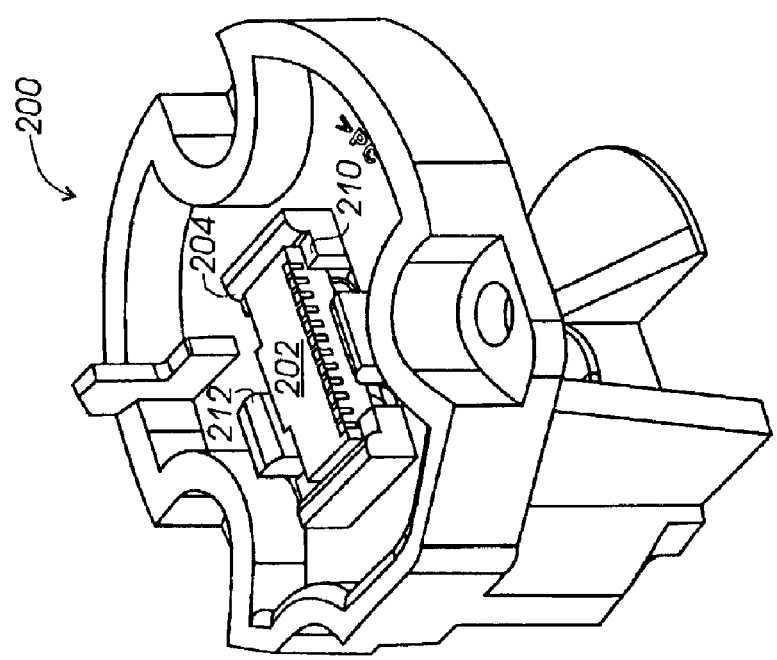
FIG. 2 is a three dimensional perspective view of a housing for an optical communication transceiver that is attachable to the access device of FIG. 1.

FIG. 1 is a perspective view of the inside and lower edge of an embodiment of a cartridge access device 100 for a storage library 700 (FIG. 7) with alignment guides 102 arranged to accurately align a component with respect to access device 100. In particular, FIG. 2 shows housing 200 that attaches to access device 100, and includes IR transceiver 202. When housing 200 is attached to the lower edge of access device 100, alignment guides 102 cooperate with mounting structures 204 and/or 212 (FIG. 2) to align IR transceiver 202 in position for accurate operation.

Figure 6:
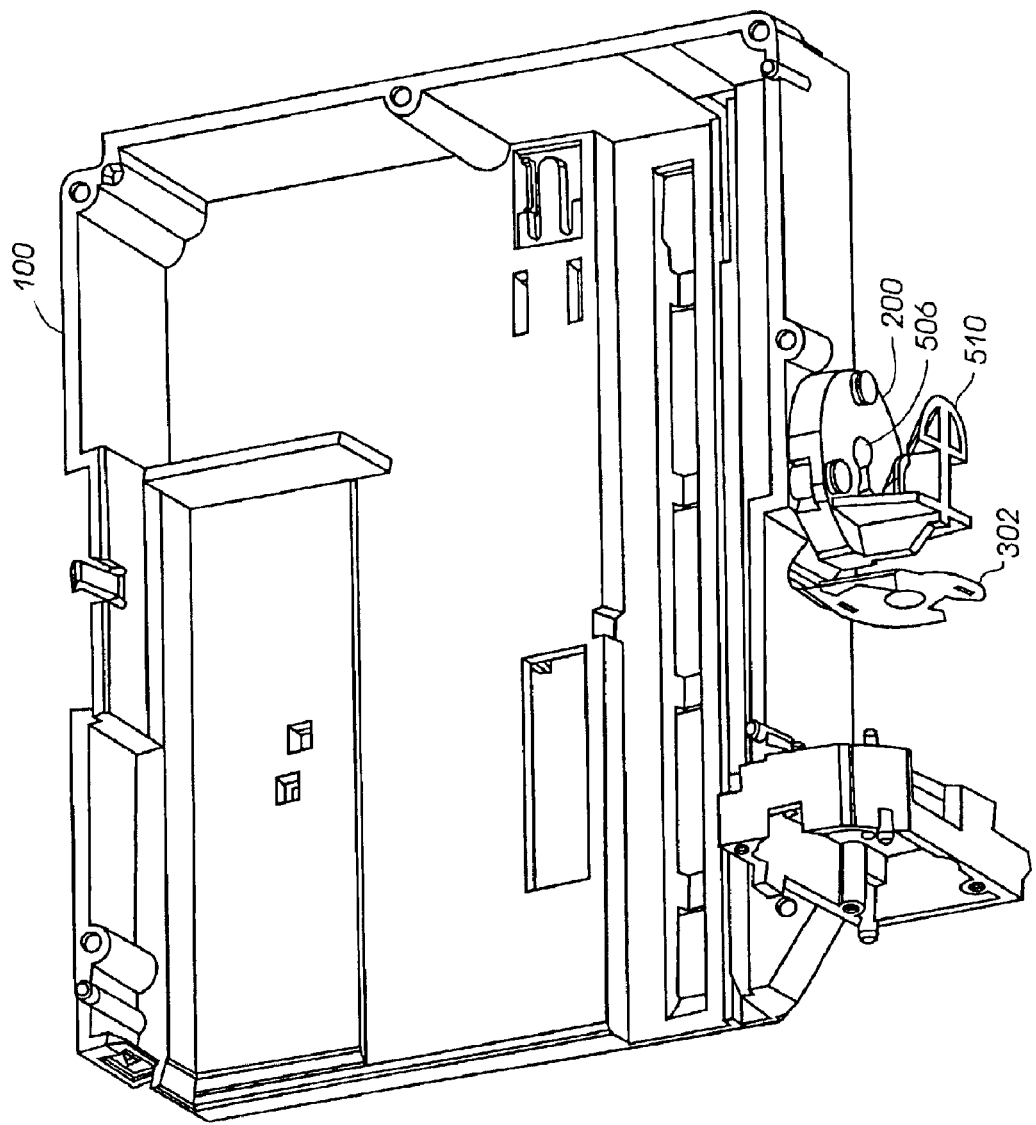
FIG. 6 is a three-dimensional side view of the cartridge access device depicted in FIG. 1 with the housing of FIG. 2 attached over the alignment guides.

In the embodiment shown, alignment guides 102 are positioned amid attachment points 104 so that IR transceiver 202 remains properly aligned once housing 200 is attached to access device 100 at attachment points 104. FIG. 6 shows a three-dimensional side view of cartridge access device 100 with housing 200 attached over alignment guides 102.

Referring to FIGS. 1 and 2, FIG. 1 shows alignment guides 102 as two spaced, raised parallel bars with triangular cross-sections that are co-formed with access device 100. The number, shape, dimensions, and locations of alignment guides 102, 204, and/or 212 can be adjusted to align virtually any size and shape of component, in one, two, and three dimensions. Further, alignment guides 102 can be molded in unitary construction with the device, or formed separately and affixed to a device using any suitable attachment method, such as an adhesive, other bonding method, or mechanical fasteners.

IR transceiver 202 is initially positioned in mounting structures 204, 212 as shown in FIG. 2. The embodiments of mounting structures 204 shown are positioned on opposing ends of IR transceiver 202, and can include lateral portions 210 to accurately position IR transceiver 202 in two dimensions in housing 200. Mounting structures 204 and/or 212 cooperate with alignment guides 102 on access device 100 (FIGS. 1 and 4B) to align IR transceiver 202 in three dimensions, as further discussed herein. Mounting structures 204, 212 are typically co-formed with housing 200, but can also be separate components that are attached with an adhesive or other suitable attachment method.

IR transceiver 202 includes emitter 504 and detector 506 (FIG. 5B), which transmit and receive optical signals through an opening in housing 200. A level reference plane with respect to mirrors 508, 510 must be provided for accurate optical signal transmission and reception of emitter 504 and detector 506, respectively. While housing 202 can include structure around emitter 504 and detector 506 to provide a reference plane and location, IR transceiver 202 may not be properly aligned due to irregularities on the surface of the packaging around emitter 504 and detector 506. Such irregularities can occur, for example, from excess adhesive around emitter 504 and detector 506, or flatness irregularities in the material used to shield IR transceiver 202.

Figure 4B:
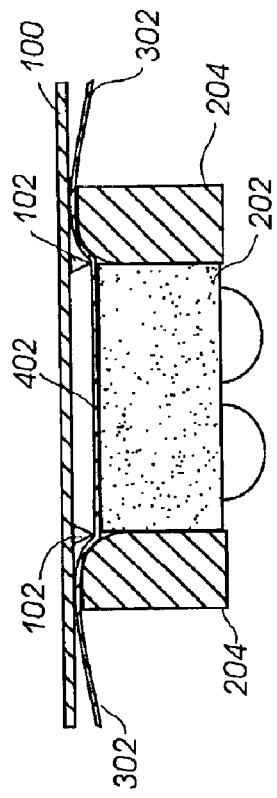
FIG. 4B shows a cross-sectional side view of the flex circuit of FIG. 4A stretched over the mounting structures when the housing of FIG. 2 is attached to the access device of FIG. 1.
Figure 4D:
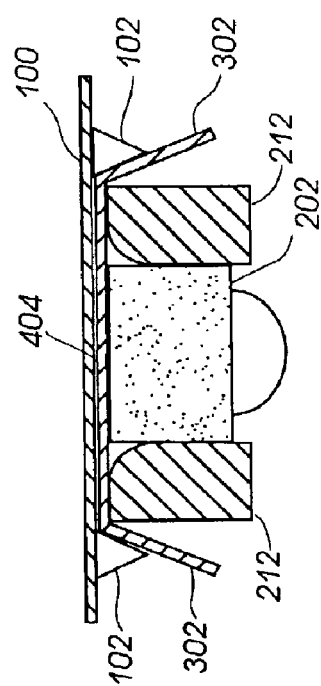
FIG. 4D shows a cross-sectional side view of the flex circuit of FIG. 4A stretched over the mounting structures when the housing of FIG. 2 is attached to the access device of FIG. 1.
Figure 4A:
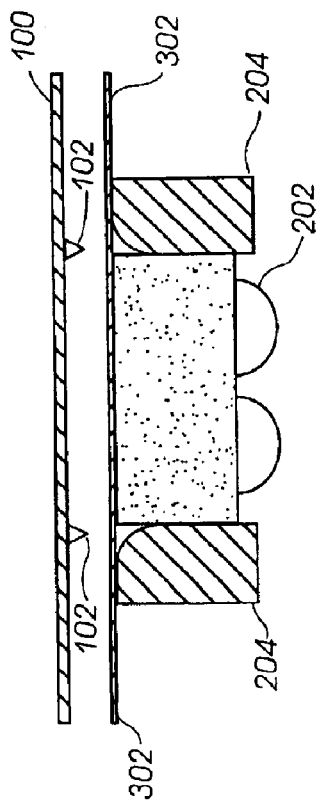
FIG. 4A shows a cross-sectional side view of a flex circuit attached to an IR transceiver and positioned over mounting structures.

Referring to FIGS. 1, 3, 4A, and 4B, a technique for aligning IR transceiver 202 in three dimensions includes attaching the back side of IR transceiver 202 to flex circuit 302. Flex circuit 302 with attached IR transceiver 202 is positioned over mounting structures 204, 212 before housing 200 is attached to access device 100. IR transceiver 202 is retained by mounting structures 204 as shown in FIG. 4A. In the embodiment shown, housing 200 is bolted to threaded ports of attachment points 104 (FIG. 1). As the bolts are tightened, alignment guides 102 push flex circuit 302 and IR transceiver 202 further down against the sides of mounting structures 204, thereby confining IR transceiver 202 within mounting structures 204 to a level reference plane 402 defined by the portion of flex circuit 302 between alignment guides 102, as shown in FIG. 4B. The dimensions of alignment guides 102 determine the height of reference plane 402 formed by flex circuit 302. Alignment guides 102 can have the same or different dimensions, depending on the alignment position desired for a particular component.

Figure 4C:
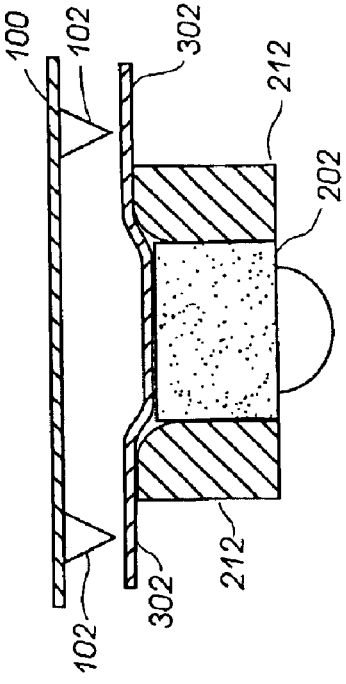
FIG. 4C shows a cross-sectional side view of a flex circuit attached to an IR transceiver and positioned over mounting structures in the housing of FIG. 2.

Referring to FIGS. 1, 3, 4C, and 4D, another technique for aligning IR transceiver 202 in three dimensions also includes attaching the back side of IR transceiver 202 to flex circuit 302. The top surfaces of mounting structures 204, 212 can be at the same height, or at different heights, depending on the desired alignment position. Flex circuit 302 with IR transceiver 202 attached is positioned over mounting structures 204, 212 before housing 200 is attached to access device 100. IR transceiver 202 is retained by mounting structures 204 as shown in FIG. 4C until housing 200 is attached to access device 100. In the embodiment shown, housing 200 is bolted to threaded ports of attachment points 104 (FIG. 1). As the bolts are tightened, alignment guides 102 are positioned on access device 100 to stretch flex circuit 302 over mounting structures 212, thereby bringing IR transceiver 202 to level reference plane 404 formed by flex circuit 302. IR transceiver 202 is confined within mounting structures 212 to reference plane 404, as shown in FIG. 4D.

Flex circuits 302 are used in a wide range of circuit applications, and typically electrically conductive wires encased in a flexible dielectric material. Various methods, such as soldering and surface mounts, can be used to mount components and connectors to flex circuit 302. In the embodiments discussed herein, flex circuit 302 is used to interconnect IR transceiver 202 and a control system 1002 (FIG. 10) for access device 100 as further described herein.

Figure 5A:
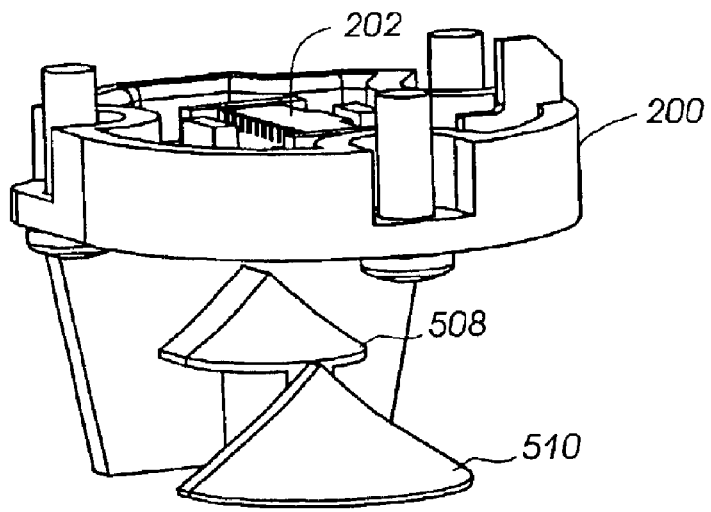
FIG. 5A is a three dimensional perspective view of the housing of FIG. 2 showing the transceiver position with respect to a set of conical mirrors.

IR transmitter 202 must be accurately aligned in three dimensions with respect to conical mirrors 508, 510 (FIG. 5) so that optical communication signals can be detected between devices. When used with alignment guides 102, flex circuit 302 not only transmits signals between IR transmitter 202 and control system 1002 (FIG. 10), but also provides a simple, accurate, and cost-effective solution for aligning IR transceiver 202 to a three-dimensional coordinate reference system. Further, the exact location of IR transceiver 202 will be known even before IR transceiver 202 is installed, thereby simplifying calibration procedures. As a further benefit, IR transceiver 202 is securely retained between attachment points 102, mounting structures 204 and 212, and therefore the location and orientation of IR transceiver 202 with respect to other components should remain unchanged throughout operation.

It should be noted that in other situations, particularly when an electrical connection to the component to be aligned is not required, any suitable material can be attached to the component and retained between alignment guides 102 and mounting structures 204, 212 to align the component to a reference plane instead of flex circuit 302. Further, alignment guides 102 can be used alone to align a component in two dimensions, or in conjunction with mounting structures 204, 212 and another material, such as flex circuit 302, to align a component in three dimensions. As a further alternative, a flexible cushion material can be provided between alignment guides 102 to retain IR transceiver 202 or other component in position by applying pressure against the component, instead of lifting the component to a reference plane with flex circuit 302 or other material. Alignment guides 102 and 212 can also be textured to help retain flex circuit 302 or other material through frictional forces.

Figure 7:
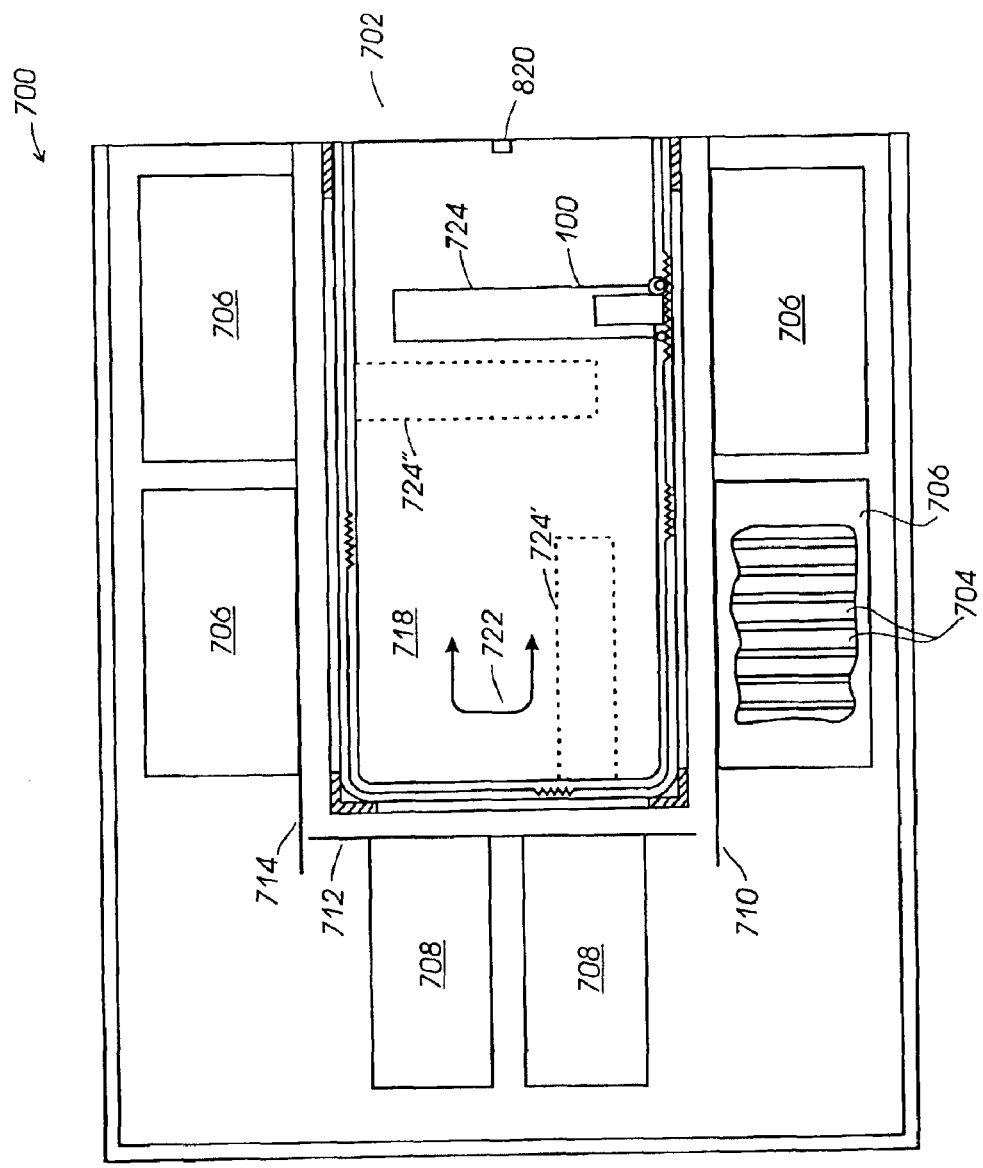
FIG. 7 is a top view of an embodiment of a cartridge storage system showing the access device of FIG. 1 in various positions.

As an example of one use for a properly aligned IR transceiver 202, FIG. 7 shows an embodiment of cartridge storage system 700 that includes a cartridge handling system 702 for transferring cartridges 704 between one or more cartridge-receiving devices, such as one or more cartridge storage racks or magazines 706, and one or more cartridge read/write devices 708. Although other configurations are possible, the various cartridge-receiving devices (e.g., the cartridge storage racks or magazine 706 and the cartridge read/write devices 708) may be positioned at various locations around the cartridge handling system 702 so that they define the generally U-shaped configuration shown in FIG. 7. Accordingly, the cartridges 704 may be accessed from three (3) cartridge access planes 710, 712, and 714.

Figure 8:
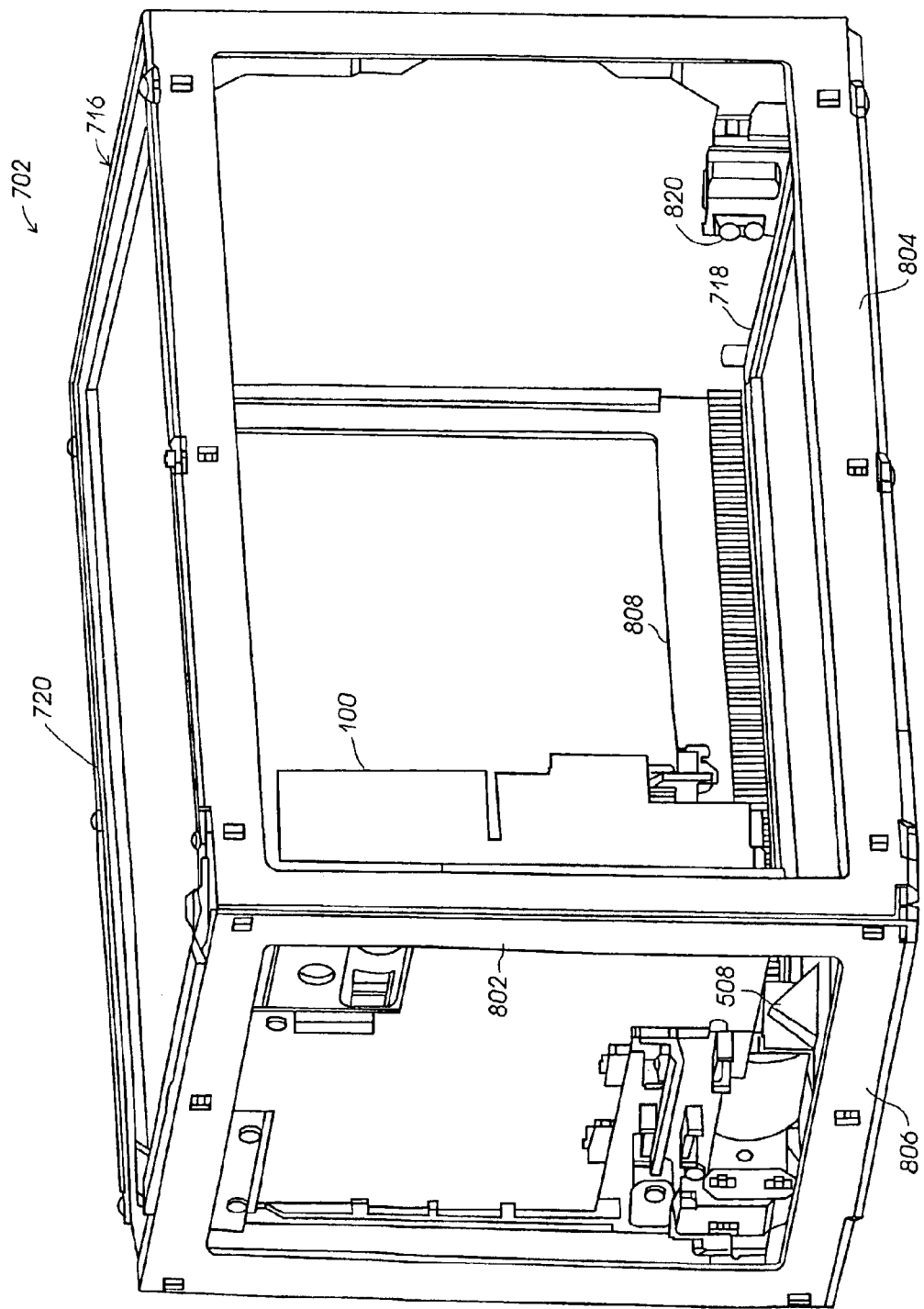
FIG. 8 is a three-dimensional side view of a frame assembly that may be used to house the cartridge access device depicted in FIG. 1.

Cartridge handling system 702 is shown in more detail in FIG. 8 comprising a frame assembly 716 which includes a lower or base plate 718 and an upper or top plate 720 that are held in generally parallel, spaced-apart relation by a support structure 802. Frame assembly 716 of cartridge handling system 702 can define a first cartridge access side 804, a second cartridge access side 806, and a third cartridge access side 808. First and third cartridge access sides 804 and 808 can be positioned in generally spaced-apart relation, whereas the second cartridge access side 806 can be oriented generally transverse to the first and third cartridge access sides 804 and 808. The various cartridge-receiving devices can be positioned around the cartridge handling system 702 so that cartridge access planes 710, 712, and 714 (FIG. 7) defined by the cartridge-receiving devices are located adjacent cartridge access sides 804, 806, and 808.

Lower plate 718 of frame assembly 716 can include a lower U-shaped guide member or channel 810 that forms a substantially continuous member along first, second, and third cartridge access sides 804, 806, and 808 of frame assembly 716. Similarly, upper plate 720 can include an upper U-shaped guide member or channel that also forms a substantially continuous member along the first, second, and third cartridge access sides 804, 806, and 808 of the frame assembly 716.

Cartridge handling system 702 (FIG. 8) can also include a cartridge access device 100 (FIGS. 1, 6, 7, 8, and 9) capable of loading and retrieving cartridges 704 (FIG. 7) from cartridge-receiving devices (e.g., cartridge storage racks 706 and cartridge read/write devices 708). Cartridge access device 100 engages upper and lower U-shaped guide members or channels 810 and 812 in respective lower and upper plates 718 and 720, and is thus guided by lower and upper guide members 810 and 812 along first, second, and third cartridge access sides 804, 806, and 808. That is, cartridge access device 100 moves along a generally U-shaped path 722 (FIG. 7). For example, cartridge access device 100 can be moved between a first position 724 adjacent first access side 804 of frame assembly 716, a second position 724' adjacent second access side 806, and a third position 724" adjacent third access side 808, as seen in FIG. 7. Cartridge access device 100 can also be moved from a position adjacent third cartridge access side 808 to positions adjacent either second cartridge access side 806 or first cartridge access side 804.

In operation, cartridge storage system 700 can be used to transfer a plurality of cartridges 704 between the various cartridge-receiving devices (e.g., cartridge storage racks or magazines 706 and the cartridge read/write devices 708) positioned adjacent first, second, and third cartridge access sides 804, 806, and 808. Therefore, cartridge storage system 700 can be used by a computer system 900 (FIG. 9), for example, or other data processing system to store and access data contained in cartridges 704.

In this regard, computer system 900 can includes control logic 902 that determines when data should be stored on or read from a particular cartridge 704. Control logic 902 of computer system 900 can be implemented in software, hardware, or a combination thereof. In some embodiments, as illustrated by way of example in FIG. 9, control logic 902, along with its associated methodology, is implemented in software and stored in computer memory 904 of computer system 900. Note that control logic 902 can be stored and transported on any computer-readable medium for use by or in connection with a computer-readable system or method. In the context of this disclosure, a computer-readable medium is an electronic, magnetic, optical, or other physical device or means that can contain or store a computer program for use by, or in connection with, a computer-related system or method. As an example, control logic 902 can be magnetically stored and transported on a conventional portable computer diskette.

Figure 9:
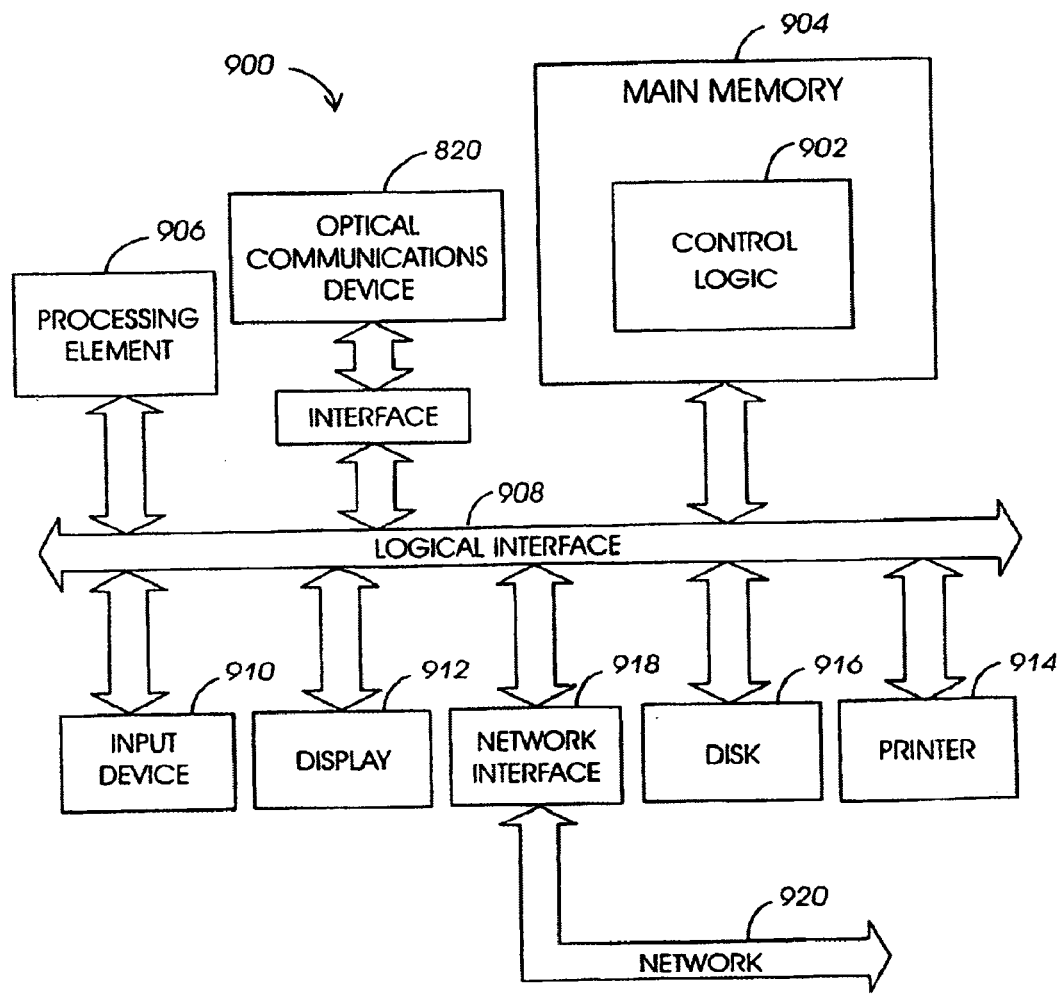
FIG. 9 is a block diagram illustrating a computer system that uses the cartridge storage system of FIG. 7 to retrieve and store data cartridges.

In a specific embodiment, computer system 900 of FIG. 9 comprises one or more conventional processing elements 906, such as a digital signal processor (DSP) that communicates with and drives the other elements within computer system 900 via a local interface 908, which can include one or more buses. Furthermore, an input device 910, for example, a keyboard or a mouse, can be used to input data from a user of computer system 900, and screen display 912 or a printer 914 can be used to output data to the user. A disk storage mechanism 916 can be connected to local interface 908 to transfer data to and from a nonvolatile disk (e.g., magnetic, optical, etc.). Computer system 900 can be connected to a network interface 918 that allows computer system 900 to exchange data with a network 920.

Computer system 900 also can include communications device 820 (FIGS. 8 and 9) coupled to computer system 900 via any suitable interface 922. Communications device 820 communicates wireless signals with cartridge access device 100. If control logic 902 determines that a particular cartridge 704 should be retrieved, control logic 902 issues a request for data to cartridge access device 100 via communications device 820.

IR transceiver 202 is an example of optical communications devices that can be utilized in storage system 700, however, storage system 700 can be configured to communicate using other types of wireless signals, in which communications device that are compatible with the types of signals being communicated will be utilized instead of, or in addition to, communications device 820, and IR transceiver 202.

Figure 10:
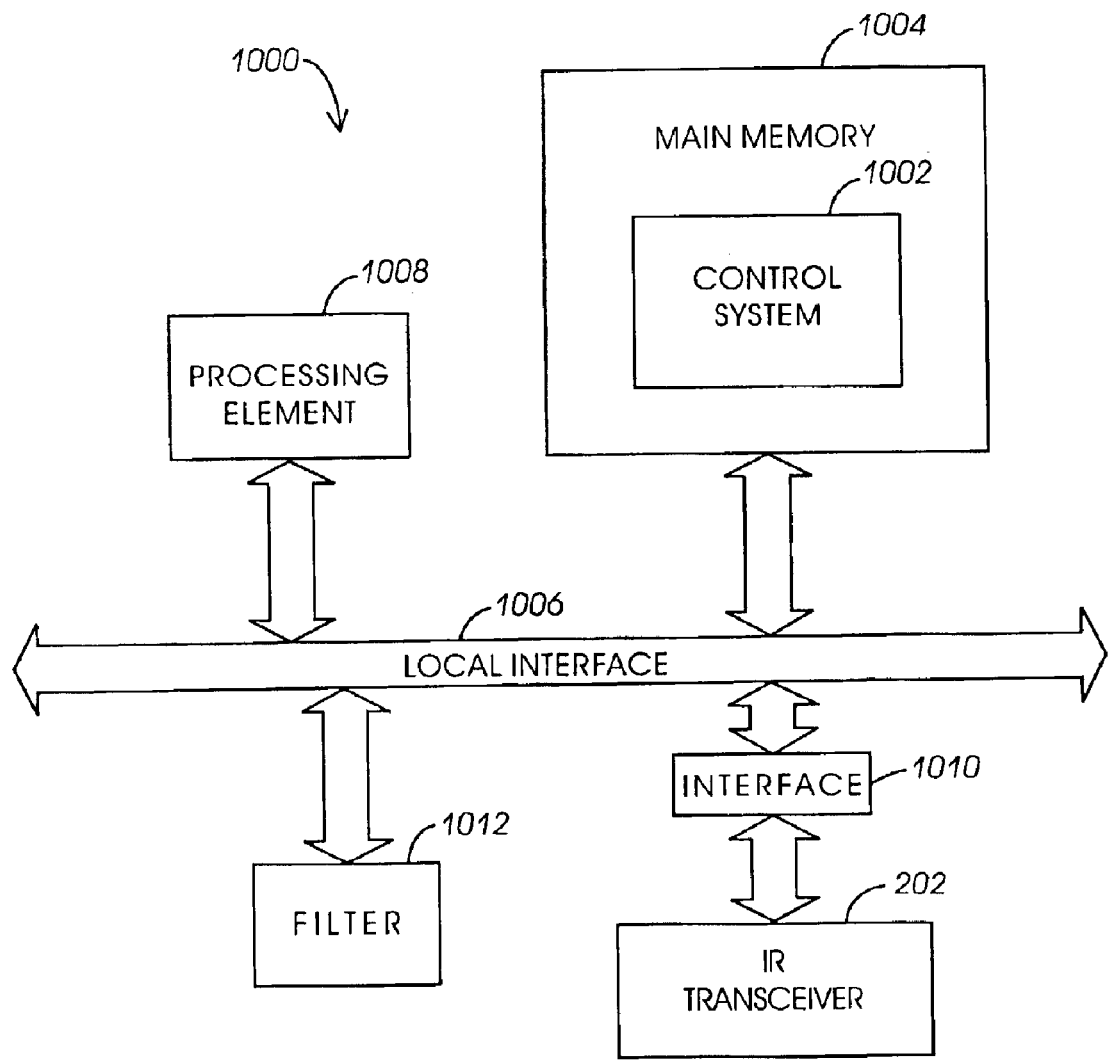
FIG. 10 is a block diagram illustrating a computer system for controlling the cartridge access device of FIG. 1.

A control system 1002 (FIG. 10) associated with cartridge access device 100 controls the actuator system on the cartridge access device 100 as necessary to move cartridge access device 100 along the U-shaped path 722 until cartridge access device 100 is located adjacent the appropriate cartridge 704. Control system 1002 can be implemented in software, hardware, or a combination thereof. In some embodiments, as illustrated in FIG. 10, control system 1002 along with its associated methodology is implemented in software and stored in computer memory 1004 of a computer system 1000. Computer system 1000 can be located on cartridge access device 100. Note that control system 1002 can be stored and transported on any computer-readable medium for use by or in connection with a computer-readable system or method.

In a specific embodiment, computer system 1000 comprises one or more conventional processing elements 1008, such as a digital signal processor (DSP). Processing elements 1008 communicate with and drive the other elements within computer system 1000 via a local interface 1006, which can include one or more buses. Computer system 1000 further includes IR transceiver 202 for communicating optical signals with optical communications device 820 of computer system 900. IR transceiver 202 is coupled to computer system 1000 via any suitable interface 1010.

Consider, for example, an initial condition wherein the desired cartridge 704 is stored in one of cartridge storage racks or magazines 706 (FIG. 7). Upon receiving a request for cartridge 704 from computer system 900 (FIG. 9), control system 1002 (FIG. 10) operates to move cartridge access device 100 along U-shaped path 722 (FIG. 7) until cartridge access device 100 is adjacent selected cartridge 704 in magazine 706. A cartridge engaging device or "picker" (not shown) associated with cartridge access device 100 then engages cartridge 704 and draws it into cartridge access device 100, as depicted by FIG. 9. Control system 1002 operates to move cartridge access device 100 to a desired cartridge read/write device 708 (FIG. 7). Once properly positioned adjacent the desired cartridge read/write device 708, the cartridge engaging assembly or picker (not shown) associated with cartridge access device 100 loads cartridge 704 into cartridge read/write device 708. Computer system 900 (FIG. 9) is configured to have access to the data on cartridge 704 once cartridge 704 is loaded into cartridge read/write device 708.

Referring to FIGS. 7, 8, 9 and 10, computer system 900 can determine that a particular cartridge 704 is needed for processing (i.e., for writing data to or reading data from the particular cartridge 704). Computer system 900 transmits a request for retrieval of the particular cartridge 704 to control system 1002 within cartridge access device 100. In this regard, computer system 900 includes optical communications device 820 which is designed to communicate with the IR transceiver 202 of computer system 1000 on cartridge access device 100.

Figure 5B:
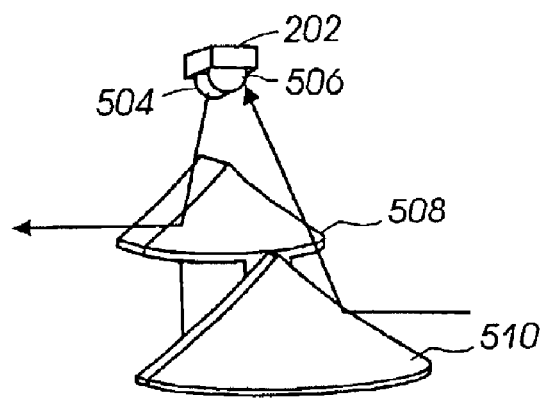
FIG. 5B is a three-dimensional side view of the transceiver and conical mirrors of FIG. 4A illustrating light signals being reflected into the transceiver.
Figure 5C:
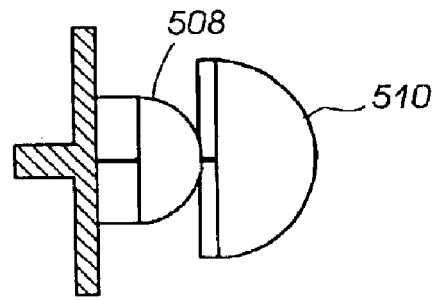
FIG. 5C is a side view of the conical mirrors of FIG. 5B.

In order for optical communications device 820 and IR transceiver 202 to communicate without regard to the location of cartridge access device 100 along U-shaped path 722, cartridge access device 100 can include conical mirrors 508, 510, as depicted by FIG. 5C. Conical mirrors 508, 510 are typically comprised of a material that reflects optical light. Furthermore, conical mirrors 508, 510 are positioned so that conical mirrors 508, 510 remain within view of optical communications device 820 as cartridge access device 100 moves around U-shaped path 722. In some embodiments, conical mirrors 508, 510 are positioned on a lower edge of cartridge access device 100, as depicted in FIG. 7. However, conical mirrors 508, 510 can be located in other positions relative to cartridge access device 100. Since conical mirrors 508, 510 are typically comprised of a reflective material, and are in view of optical communications device 820 regardless of the cartridge access device's position along U-shaped path 722, conical mirrors 508, 510 are designed to reflect each optical signal transmitted to and from optical communications device 820.

In addition, IR transceiver 202 can be positioned adjacent to (i.e., directly above) the tip of conical mirrors 508, 510, as depicted in FIG. 5B. The slope of the sides of conical mirror 510 directly facing optical communications device 820 are configured to reflect the light transmitted from the optical communications device 820 into detector 506 of IR transceiver 202, as depicted by FIG. 5B. As cartridge access device 100 moves around the U-shaped path 722, different sides of conical mirror 510 directly face optical communications device 820 and reflect light into detector 506 of IR transceiver 202. Therefore, as cartridge access device 100 moves around U-shaped path 722, each optical signal transmitted from optical communications device 820 is reflected into the receiver portion of the IR transceiver 202, regardless of the cartridge access device's location on the U-shaped path 722.

Furthermore, by being located adjacent to the tip of the conical mirror 508, each optical signal transmitted by IR transceiver 202 is reflected by at least each conical side of conical mirror 508 that directly faces optical communications device 820 at some point as the cartridge access device 100 moves around U-shaped path 722. Therefore, optical communications device 820 receives light from each signal transmitted by IR transceiver 202 regardless of the cartridge access device's position on U-shaped path 722, since at least one side of conical mirrors 508, 510 is directly facing optical communications device 820 at each position of cartridge access device 100 along U-shaped path 722. As a result, when IR transceiver 202 is accurately aligned, communication between optical communication device 820 and IR transceiver 202 is maintained as the cartridge access device 100 moves around U-shaped path 722.

The logic modules and circuitry described here may be implemented using any suitable combination of hardware, software, and/or firmware, such as Field Programmable Gate Arrays (FPGAs), Application Specific Integrated Circuit (ASICs), or other suitable devices. A FPGA is a programmable logic device (PLD) with a high density of gates. An ASIC is a microprocessor that is custom designed for a specific application rather than a general-purpose microprocessor. The use of FPGAs and ASICs improves the performance of the system over general-purpose CPUs, because these logic chips are hardwired to perform a specific task and do not incur the overhead of fetching and interpreting stored instructions. The logic modules and other components have been discussed as separate and discrete components. These components may, however, be combined, if desired.

While the invention has been described with reference to various embodiments, it will be understood that these embodiments are illustrative and that the scope of the invention is not limited to them. Many variations, modifications, additions and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims.

What is claimed is:

1. An assembly for aligning a component, comprising:
a first device;
an alignment guide positioned on the first device; and
at least one attachment point on the first device, wherein the component is included in a second device, and the component is aligned by the alignment guide as the second device is attached to the first device.

2. An assembly according to claim 1 wherein the second device includes a mounting structure that cooperates with the alignment guide to align the component as the second device is attached to the first device.

3. An assembly according to claim 1 further comprising:
at least two alignment guides positioned on the first device to engage at least two mounting structures on the second device as the second device is attached to the first device.

4. An assembly according to claim 3 wherein the mounting structures are positioned so that the alignment guides engage side portions of the mounting structure, the assembly further comprising:
a flexible portion of material attached to the component and positionable over the mounting structures, wherein the alignment guides retain the flexible portion of material in position with respect to the mounting structures as the second device is attached to the first device.

5. An assembly according to claim 4 wherein the second device includes at least one mounting structure for initially positioning the component until the second device is attached to the first device.

6. An assembly according to claim 1 further comprising:
a plurality of attachment points, wherein the alignment guide is positioned among at least a portion of the plurality of attachment points.

7. An assembly according to claim 1 wherein the first device is a cartridge access device for an automated storage system.

8. An assembly according to claim 7 wherein the component is an infrared transceiver.

9. An assembly according to claim 8 wherein the second device includes a reflective mirror, and the infrared transceiver is aligned to emit and detect optical signals reflected by the mirror.

10. A storage system comprising:
a cartridge access device;
a plurality of alignment guides attached to the cartridge access device;
a housing for a communication device, wherein the housing is attached to the cartridge access device over the alignment guides so that the alignment guides position the communications device in proper position for operation.

11. A storage system according to claim 10 further comprising:
a flex circuit attached to the communications device, wherein the flex circuit is positioned to be retained by the alignment guides when the housing is attached to the cartridge access device.

12. A storage system according to claim 11 further comprising:
a plurality of mounting structures in the housing, wherein the flex circuit overlays the mounting structures, and the alignment guides engage the mounting structures to retain the flex circuit in position with respect to the moutning structures.

13. An apparatus for aligning a component in a device comprising:
retaining means for initially aligning the component in at least one dimension;
first alignment means proximate the component;
flexible means for providing a reference plane for the component, wherein one side of the component is attached to the flexible means; and
second alignment means configured to retain the flexible means over the first alignment means when the second alignment means engages the first alignment means.

14. A system for aligning a component in a device comprising:
a component attached to a portion of material, wherein the material overlays a first, set of alignment guides with the component positioned between the first set of alignment guides; and
a second set of alignment guides engages the first set of alignment guides to retain the material in the first set of alignment guides.

15. A system according to claim 14 wherein the component is an electro-optical component.

16. A system according to claim 15 wherein the portion of material retained between the first set of alignment guides provides a reference plane for the electro-optical component.

17. A system according to claim 16 wherein the material is a flex circuit.

18. A system according to claim 17 wherein the system is a storage system.

19. A system according to claim 18 wherein the first set of alignment guides are attached to a housing for a reflective mirror, and the second set of alignment guides are attached to a cartridge access device.

* * * * *

UNITED STATES PATENT AND TRADEMARK OFFICE
CERTIFICATE OF CORRECTION

PATENT NO. : 7,024,758 B2  Page 1 of 1
APPLICATION NO. : 10/447343
DATED : April 11, 2006
INVENTOR(S) : Gregg S. Schmidtke et al.

It is certified that error appears in the above-identified patent and that said Letters Patent is hereby corrected as shown below:

In column 10, line 16, in Claim 12, delete "moutning" and insert -- mounting --, therefor.

In column 10, line 32, in Claim 14, after "first" delete ",".

Signed and Sealed this

Nineteenth Day of May, 2009

JOHN DOLL
*Acting Director of the United States Patent and Trademark Office*